(12) United States Patent
Knight et al.

(10) Patent No.: US 11,584,881 B2
(45) Date of Patent: Feb. 21, 2023

(54) LOW-TEMPERATURE STABILIZED SURFACTANT BLEND FOR ENHANCED OIL RECOVERY

(71) Applicant: Dow Global Technologies LLC, Midland, MI (US)

(72) Inventors: Troy E. Knight, Missouri City, TX (US); Susan K. Falcone-Potts, Clute, TX (US); Martha Hernandez, Lake Jackson, TX (US); Amit Katiyar, Sugar Land, TX (US); Pramod D. Patil, Sugar Land, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 16/625,161

(22) PCT Filed: May 3, 2018

(86) PCT No.: PCT/US2018/030763
§ 371 (c)(1),
(2) Date: Dec. 20, 2019

(87) PCT Pub. No.: WO2019/005289
PCT Pub. Date: Jan. 3, 2019

(65) Prior Publication Data
US 2020/0231862 A1    Jul. 23, 2020

Related U.S. Application Data

(60) Provisional application No. 62/527,258, filed on Jun. 30, 2017.

(51) Int. Cl.
*C09K 8/584* (2006.01)
*E21B 43/16* (2006.01)

(52) U.S. Cl.
CPC ............ *C09K 8/584* (2013.01); *E21B 43/16* (2013.01)

(58) Field of Classification Search
None
See application file for complete search history.

(56) References Cited

U.S. PATENT DOCUMENTS

| | | | |
|---|---|---|---|
| 6,302,209 B1 | 10/2001 | Thompson, Sr. et al. | |
| 10,370,584 B2 | 8/2019 | Velez et al. | |
| 2014/0110117 A1* | 4/2014 | Abbas | E21B 43/166 166/300 |
| 2015/0129227 A1* | 5/2015 | Barnes | C09K 8/584 166/305.1 |
| 2015/0338477 A1 | 11/2015 | Schmidt et al. | |
| 2017/0044422 A1 | 2/2017 | Abbas et al. | |
| 2017/0321111 A1 | 11/2017 | Velez et al. | |
| 2017/0355897 A1 | 12/2017 | Bittner et al. | |

FOREIGN PATENT DOCUMENTS

| | | | | |
|---|---|---|---|---|
| EP | 0032072 A1 | | 7/1981 | |
| EP | 0482687 A1 | * | 4/1992 | ............ C11D 1/83 |
| EP | 2794698 B1 | | 4/2015 | |
| WO | WO-2016048765 A1 | * | 3/2016 | ............ E21B 43/20 |

OTHER PUBLICATIONS

PCT/US2018/030763, International Search Report and Written Opinion dated Jul. 16, 2018.
PCT/US2018/030763, International Preliminary Report on Patentability dated Dec. 31, 2019.

* cited by examiner

*Primary Examiner* — Charles R Nold

(57) ABSTRACT

Disclosed is a temperature stabilized aqueous wettability composition and method of use for the recovery of petroleum from subterranean formulations. Said aqueous wettability composition comprises a polyethylene oxide nonionic surfactant, a disulfonated anionic surfactant, and one or more alcohol.

6 Claims, No Drawings

LOW-TEMPERATURE STABILIZED SURFACTANT BLEND FOR ENHANCED OIL RECOVERY

FIELD OF THE INVENTION

This invention is related to the application of a low temperature stabilized aqueous solutions of nonionic and anionic surfactants as wettability modifiers to subterranean formations in an enhanced oil recovery process to increase the oil recovery factor.

BACKGROUND OF THE INVENTION

There is a challenge in subterranean petroleum recovery to extract as much petroleum from a subterranean formation as possible. After primary and secondary recovery, the oil field still contains 50 to 80 percent of the oil originally in place. The efficiency of the methods of primary and secondary recovery is limited by two factors: The scale of the pores, the crude oil can reach a sufficiently low residual saturation found as discontinuous cells, trapped by capillary forces. The scale of the site, there are certain areas in which the fluid injected during secondary recovery does not penetrate, because of the low permeability of these zones.

Currently, methods for enhanced oil recovery involve one or more of these factors and the use of chemical products as wettability modifiers. Wettability modifiers are defined as a surfactants capable of changing the affinity of reservoir rock in favorable manner. The wettability is a measure of the interaction between the phases present in the reservoir and is a function of interfacial chemistry of these phases and determines the tendency of a fluid for moving or adhering to a solid surface in the presence of other immiscible fluids. The wettability of a rock can be naturally modified by adsorption of polar compounds, the formation of deposits of organic material that is originally in the oil, or by external agents. Changes in the wettability affect capillary pressure, relative permeability, residual oil saturation, and irreducible water saturation. Additionally, and equally important, is the recognition that the confinement of the fluid substantially modifies the behavior of their phases with respect to its properties in the bulk.

There are a variety of specific types of chemicals that have been used to solve these problems, within which are anionic surfactants such as sodium alkyl sulfonates, but unfortunately their application is not universal. Globally, because of the wide range of temperatures where such chemicals are employed, stability issues may arise. It is known that the solubility of nonionic surfactants in water decreases with temperature and that a nonionic surfactant eventually becomes insoluble when reaching what is known as a cloud point temperature. Reduced solubility at low temperatures often results in aqueous anionic surfactant solutions becoming turbid. Once a solution becomes turbid, phase separation can result producing high viscosity and/or gelling problems. Such viscosity and/or gelling problems can adversely affect the transportation, use, and/or storage of aqueous anionic surfactants at low temperatures.

Accordingly, it is desirable to provide aqueous wettability compositions, especially aqueous anionic surfactant wettability compositions, which have good stability at low temperatures; for example, at −5° C. or lower in winter in accordance with storage and use conditions.

BRIEF SUMMARY OF THE INVENTION

In a first aspect, the present invention is a method for recovering petroleum from a subterranean formation, the method comprising injecting an aqueous solution into the subterranean formation to displace petroleum wherein the aqueous solution comprises: (i) a nonionic surfactant of structure (I):

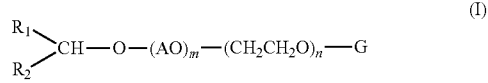

where $R_1$ is a linear or branched alkyl with from one to 23 carbons; $R_2$ is selected from hydrogen and linear or branched alkyls with from one to 23 carbons provided that the total number of carbons in the combination of $R_1$ and $R_2$ is in a range of 7 to 23; (AO) is selected from a group consisting of $CH(CH_3)CH_2O$ and $CH(CH_2CH_3)CH_2O$; m is a number from zero to 10; n is a number from 5 to 30; and G is selected from a group consisting of hydrogen, chlorine, alkyl groups with one to four carbons, and COR' where R' is an alkyl with from one to four carbons; (ii) optionally, an anionic surfactant of structure (II):

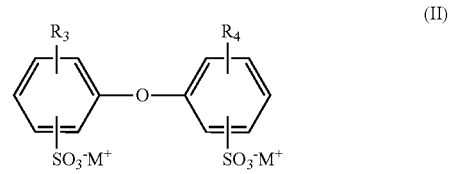

where $R_3$ and $R_4$ are each independently selected from a group consisting of hydrogen and linear and branched alkyl groups with one to 16 carbons; and M is selected from sodium, potassium, lithium and ammonium; (iii) one or more the alcohol of structure (III):

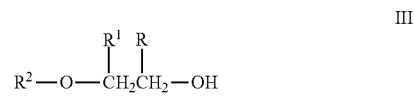

wherein R and $R^1$ are independently H, or a $C_1$ to $C_6$ linear or branched alkyl group and $R^2$ is H, a $C_1$ to $C_6$ linear or branched alkyl group, or $R^3$—$(OCH_2CH_2)_n$— wherein $R^3$ is a H or a linear or branched $C_1$ to $C_6$ alkyl group and n is equal to 1 to 6, and (iv) water.

The present invention is useful for subterranean petroleum recovery.

DETAILED DESCRIPTION OF THE INVENTION

"And/or" means "and, or alternatively". All ranges include endpoints unless otherwise stated. Parts per million (ppm) refers to weight parts based on total aqueous solution weight unless otherwise indicated. Subscript values in polymer formulas refer to mole average values for the designated component of the polymer.

Test methods refer to the most recent test method as of the priority date of this document unless a date is indicated with the test method number as a hyphenated two digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standards.

The present invention comprises injecting an aqueous solution into a subterranean formation where the aqueous solution comprises or consists essentially of or consist of (i) a nonionic surfactant, (ii) an anionic surfactant, and (iii) an alcohol.

The nonionic surfactant (i) of the present invention has the following structure (structure (I)):

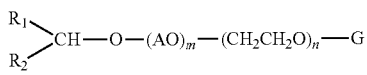

where $R_1$ is a linear or branched alkyl with from one to 23 carbons; $R_2$ is selected from hydrogen and linear or branched alkyls with from one to 23 carbons provided that the total number of carbons in the combination of $R_1$ and $R_2$ is in a range of 7 to 23; (AO) is selected from a group consisting of $CH(CH_3)CH_2O$ and $CH(CH_2CH_3)CH_2O$; m is a number from zero to 10; n is a number from 5 to 30, preferably to 20; and G is selected from a group consisting of hydrogen, chlorine, alkyl groups with one to four carbons, and COR' where R' is an alkyl with from one to four carbons. Preferably, the nonionic is further characterized by any one or combination or more than one of the following desirable features:

Desirably, the average value for m is zero or more, preferably one or more, two or more even three or more and at the same time is desirably five or less, four or less, three or less, even two or less.

Desirably the average value for n of the nonionic surfactants is 5 or more, preferably 6 or more, more preferably 7 or more and can be 8 or more, 9 or more, 10 or more, 12 or more, 14 or more, 15 or more, 16 or more, even 17 or more while at the same time is desirably 20 or less, preferably 19 or less, 18 or less, 17 or less, 16 or less, 15 or less and is preferably 14 or less.

Desirably, the $(R_1)R_2CH$— group has a total number of carbons in a range of 8 or more and can be 9 or more, 10 or more, 11 or more even 12 or more while at the same time is desirably 20 or fewer, preferably 19 or fewer, 18 or fewer, 17 or fewer, 16 or fewer or 15 or fewer. Desirably, the $(R_1)R_2CH$— group is selected from a group consisting of moieties of linear carbon chains of 11 to 15 carbons and a 2-ethylhexyl moiety.

Examples of suitable nonionic surfactants include those selected from a group consisting of surfactants having the following structures (Ia) and (Ib):

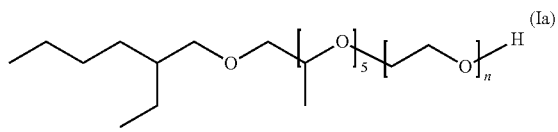

where the average value for n is selected from a group consisting of 6, 9, 14 and 20. Another example of suitable nonionic surfactants are 11-15 carbon (C11-C15), preferably 12-15 carbon (C12-C15) linear secondary alcohol initiated polyethylene glycols having a general structure of (1b)

where the asterisks indicates the polyethylene glycol chain is on any secondary carbon and the bracket of 3-7 indicates a repeat of 3-7 carbons, corresponding to a distribution of C11-C15 total chain lengths.

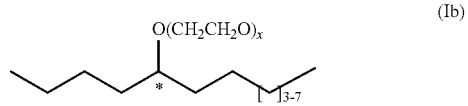

where x is selected from 5, 7, 9, 12, 15, and 20.

The aqueous wettability composition of the present invention comprises the nonionic surfactant (i) in an amount equal to or greater than 5 weight percent, preferably equal to or greater than 10, and more preferably equal to or greater than 15 weight percent, based on the total weight of the aqueous wettability composition. The aqueous wettability composition of the present invention comprises the nonionic surfactant (i) amount equal to or less than 90 weight percent, preferably equal to or less than 50, and more preferably equal to or less than 20 weight percent, based on the total weight of the aqueous wettability composition.

The anionic surfactant (ii) is a di-sulfonated anionic surfactant that has a structure of structure (II):

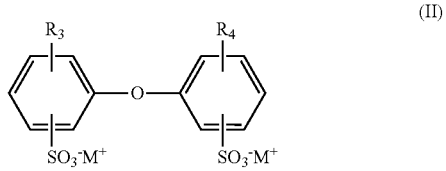

where $R_3$ and $R_4$ are each independently selected from a group consisting of hydrogen and linear and branched alkyl groups with one to 16 carbons; and M is selected from sodium, potassium, lithium and ammonium. Desirably, $R_3$ and $R_4$ are independently selected from a group consisting of hydrogen and linear hexyl group provided both $R_3$ and $R_4$ are not hydrogen at the same time. It has surprisingly been discovered that the di-sulfonate anionic surfactant provides unexpected stability to the aqueous solution, allowing the surfactant to remain stable at higher salt concentrations and higher temperatures than aqueous solutions without the di-sulfonate, even aqueous solutions with only a mono-sulfonate anionic surfactant.

If present, the aqueous wettability composition of the present invention comprises the di-sulfonated anionic surfactant (ii) in an amount equal to or greater than 10 weight percent, preferably equal to or greater than 12, and more preferably equal to or greater than 15 weight percent, based on the total weight of the aqueous wettability composition. If present, the aqueous wettability composition of the present invention comprises the di-sulfonated anionic surfactant (ii) amount equal to or less than 50 weight percent, preferably equal to or less than 45, and more preferably equal to or less than 40 weight percent, based on the total weight of the aqueous wettability composition.

The aqueous solution of the present invention necessarily contains the bi-sulfonate anionic surfactant of structure (II), and can include or be free of a monosulfonate analogue of structure (II). When one or both of monosulfonate and nonionic analogues are present, the bi-sulfonate anionic surfactant is present at a greater concentration than either of the analogues, preferably a greater concentration than the combined concentration of the analogues.

Suitable alcohols (iii) may be selected from the group consisting of glycols, glycol ethers, methanol, ethanol and combinations thereof. Preferably, the alcohol is represented by the following structure (III):

III wherein R and $R^1$ are independently H, or a $C_1$ to $C_6$ linear or branched alkyl group and $R^2$ is H, a $C_1$ to $C_6$ linear or branched alkyl group, or $R^3$-$(OCH_2CH_2)_n$— wherein $R^3$ is a H or a linear or branched $C_1$ to $C_6$ alkyl group and n is equal to 1 to 6.

Preferably, the alcohol is selected from isopropanol, diethyleneglycol monobutyl ether, diethylene glycol monopropyl ether, diethyleneglycol monoethyl ether, diethyleneglycol monomethyl ether, ethyleneglycol monopentylether, ethyleneglycol monobutyl ether, ethyleneglycol monopropylether, ethyleneglycol monoethylether, ethyleneglycol monomethylether, dipropyleneglycol monomethyl ether, dipropyleneglycol monobutyl ether, propylene glycol monomethyl ether, propylene glycol monoethyl ether, propylene glycol monopropyl ether, propylene glycol monobutyl ether, butyl acetate, propylene glycol, ethylene glycol, and combinations thereof.

In one embodiment of the present invention, the aqueous wettability composition comprises a diol, preferably ethylene glycol, propylene glycol, or a mixture thereof and a glycol ether, preferably ethyleneglycol monomethylether, ethyleneglycol monoethylether, ethyleneglycol monopropylether, ethyleneglycol monobutylether, ethyleneglycol monopentylether, or mixtures thereof.

The aqueous wettability composition of the present invention comprises each one or more alcohol in an amount equal to or greater than 10 weight percent, preferably equal to or greater than 20, and more preferably equal to or greater than 30 weight percent, based on the total weight of the aqueous wettability composition. The aqueous wettability composition of the present invention comprises each one or more alcohol in an amount equal to or less than 90 weight percent, preferably equal to or less than 80, and more preferably equal to or less than 70 weight percent, based on the total weight of the aqueous wettability composition.

In one embodiment of the present invention, the aqueous wettability composition may also contain minor amounts of other surface active agents. For example, co-surfactants such as amphoteric surfactants, as well as scale inhibitors, such as AOS dimers and chelating agents, may be present. The total amount of these additional surface active agents is preferably not greater than about 10 percent by weight of the total weight of the aqueous anionic surfactant foaming composition.

In another embodiment of the present invention, the aqueous wettability composition may contain salt including monovalent and divalent ions. The salt composition of the aqueous solution can be similar to that of the aqueous fluid in the formation in which the aqueous solution will be injected.

The balance of the aqueous anionic surfactant foaming composition of the present invention that is not (i), (ii), (iii), a solvent, or an optional other surface active agents is water (iv). In one embodiment, the total weight percents of components (i), (ii), (iii), and (iv) added together equal 100 weight percent.

Preferably, the aqueous wettability compositions of the present invention are stable to −5° C., more preferably to −10° C., more preferably to −15° C., and most preferably to −20° C. As used herein, the term "stable" is defined as flowable or pumpable at temperature.

Preferably, the aqueous wettability compositions of the present invention have a pour point as determined by ASTM D-97 of equal to or less than 15° C., preferably equal to or less than 0° C., more preferably equal to or less than −20° C., and even more preferably equal to or less than −40° C.

Subterranean petroleum recovery processes typically involve injecting a water phase into a permeable, subterranean oil-containing formation to displace crude oil remaining after a primary oil recovery effort, a process commonly known as waterflooding. Oil recovery by waterflooding can be low if using just water, so aqueous systems having enhanced recovery properties are desirable. Although this is not a necessary first step for the proper functioning for the method of the present invention, ordinarily waterflooding will be practiced in a field if any substantial amount of additional oil can be recovered from the formation by application of waterflooding. Waterflooding is continued until the water-oil ratio at the producing wells rises to such a high value that further production of petroleum from the well is impossible or economically unattractive.

In one embodiment, the present invention is a method to enhance crude oil recovery from a subterranean reservoir comprising the step of injecting the aqueous wettability composition disclosed herein above into said subterranean environment. Ideally, injection of aqueous wettability composition should be initiated before the water-oil ratio rises to a value such that further commercial production is unattractive, so as to avoid a long period of time before further additional oil production is accomplished since there is necessarily a long lag time between the initiation of aqueous wettability composition injection and the observation of improved stimulation from the production well.

In one embodiment of the method of the present invention, the subterranean environment may comprise an aqueous phase into which the aqueous wettability solution is injected.

In one embodiment of the method of the present invention, an aqueous solution of the wettability composition may be added into water or brine in the beginning of a waterflooding process, or at any point or points during a waterflooding process, including any point or points in an extended period of waterflooding.

An aqueous solution of the wettability composition of the present invention can be added in a manner of slug injection at a quantity of 0.01 to 5 times the estimated treatment volume of the reservoir section into which the aqueous solution is being injected. The aqueous solution can be applied in a manner of alternate slugs between an aqueous solution of the present invention and brine or water. After injecting the aqueous solution of the present invention it may be beneficial to lock the surfactant solution in the subterranean formation for a period of time, for example from one hour to one year, before beginning a continuous flooding with injecting additional aqueous solution of the present invention, brine, and/or water. A process of the present invention is useful together with other improved oil recovery (IOR) technologies such as low salinity water flooding, polymer flooding, foam flooding (such as carbon-dioxide foam flooding), gas flooding, and chemical flooding (such as alkaline-polymer-surfactant flooding) as a stand-alone process step or as a pretreatment step followed by other IOR processes.

The following examples illustrate the stability and efficacy of the aqueous phase of the present invention.

EXAMPLES

The following surfactants and alcohols are used in the examples:

Nonionic Surfactant

C11-C15 linear secondary alcohols initiated polyethylene glycol having the general structure as follows where the asterisks indicates the polyethylene glycol chain can be on any secondary carbon and, generally, the surfactant is represented by a distribution of structures on different secondary carbons:

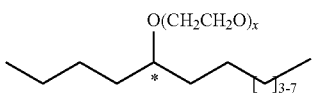

Nonionic Surfactant: x=15 (available under the tradename TERGITOL™ 15-S-15). TERGITOL is a trademark of Union Carbide Corporation.

Anionic Surfactant

ADPDS—Alkyldiphenyloxide disulfonate having the structure of (II) where $R_3$ and $R_4$ are independently selected from linear C6 (six carbon) alkyl and hydrogen provided at least one of $R_3$ and $R_4$ is a linear C6 alkyl on each molecule. The ADPDS is a combination of monoalkylated disulfonated diphenyl oxide, dialkylated disulfonated diphenyl oxide, monoalkylated monosulfonated diphenyl oxide and dialkylated monosulfonated diphenyl oxide, with the disulfonated diphenyl oxide components making up more than 50 wt % of the ADPDS composition weight. The surfactant is available as a 45 weight percent ADPDS in water under the tradename DOWFAX™ C6L. DOWFAX is a trademark of The Dow Chemical Company.

Alcohols

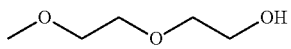

Methyl CARBITOL™

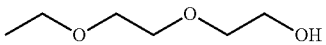

CARBITOL

 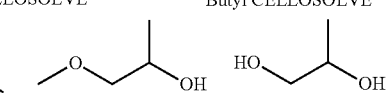 

Propyl CELLOSOLVE    Butyl CELLOSOLVE

Isopropanol    DOWANOL™ PM    Propylene Glycol

CARBITOL, CELLOSOLVE, and DOWANOL are trademarks of The Dow Chemical Company.

In the following Comparative Examples and Examples, pour points are determined according to ASTM D-97.

Examples 1 to 7

Examples 1 to 7 comprise Nonionic Surfactant (90% to 10 wt %), alcohol, and water. Tables 1 to 7 show pour point data for Examples 1 to 7, respectively.

TABLE 1

| Nonionic Surfactant (wt %) | Propyl CELLOSOLVE (wt %) | Water (wt %) | Pour Point (° C.) |
|---|---|---|---|
| 90 | 5 | 5 | 12 |
| 80 | 10 | 10 | 3 |
| 70 | 15 | 15 | −30 |
| 60 | 20 | 20 | −57 |
| 50 | 25 | 25 | −63 |
| 40 | 30 | 30 | −78 |
| 30 | 35 | 35 | −57 |
| 20 | 40 | 40 | −42 |
| 10 | 45 | 45 | −36 |

TABLE 2

| Nonionic Surfactant (wt %) | Butyl CELLOSOLVE (wt %) | Water (wt %) | Pour Point (° C.) |
|---|---|---|---|
| 90 | 5 | 5 | 12 |
| 80 | 10 | 10 | 3 |
| 70 | 15 | 15 | −21 |
| 60 | 20 | 20 | −57 |
| 50 | 25 | 25 | −69 |
| 40 | 30 | 30 | −72 |
| 30 | 35 | 35 | −61 |
| 20 | 40 | 40 | −27 |
| 10 | 45 | 45 | −21 |

TABLE 3

| Nonionic Surfactant (wt %) | Propylene Glycol (wt %) | Water (wt %) | Pour Point (° C.) |
|---|---|---|---|
| 90 | 5 | 5 | 9 |
| 80 | 10 | 10 | −3 |
| 70 | 15 | 15 | −21 |
| 60 | 20 | 20 | −45 |
| 50 | 25 | 25 | −45 |
| 40 | 30 | 30 | −54 |
| 30 | 35 | 35 | −66 |
| 20 | 40 | 40 | −72 |
| 10 | 45 | 45 | −75 |

TABLE 4

| Nonionic Surfactant (wt %) | Isopropanol (wt %) | Water (wt %) | Pour Point (° C.) |
|---|---|---|---|
| 90 | 5 | 5 | 9 |
| 80 | 10 | 10 | 0 |
| 70 | 15 | 15 | −21 |
| 60 | 20 | 20 | −63 |
| 50 | 25 | 25 | −69 |
| 40 | 30 | 30 | −66 |
| 30 | 35 | 35 | −57 |
| 20 | 40 | 40 | −51 |
| 10 | 45 | 45 | −48 |

TABLE 5

| Nonionic Surfactant (wt %) | DOWANOL PM (wt %) | Water (wt %) | Pour Point (° C.) |
|---|---|---|---|
| 90 | 5 | 5 | 12 |
| 80 | 10 | 10 | 3 |
| 70 | 15 | 15 | −18 |
| 60 | 20 | 20 | −60 |
| 50 | 25 | 25 | −72 |
| 40 | 30 | 30 | −69 |
| 30 | 35 | 35 | −72 |
| 20 | 40 | 40 | −78 |
| 10 | 45 | 45 | −78 |

TABLE 6

| Nonionic Surfactant (wt %) | Methyl CARBITOL (wt %) | Water (wt %) | Pour Point (° C.) |
|---|---|---|---|
| 90 | 5 | 5 | 9 |
| 80 | 10 | 10 | 0 |
| 70 | 15 | 15 | −15 |
| 60 | 20 | 20 | −27 |
| 50 | 25 | 25 | −54 |
| 40 | 30 | 30 | −57 |
| 30 | 35 | 35 | −66 |
| 20 | 40 | 40 | −72 |
| 10 | 45 | 45 | −57 |

TABLE 7

| Nonionic Surfactant (wt %) | CARBITOL (wt %) | Water (wt %) | Pour Point (° C.) |
|---|---|---|---|
| 90 | 5 | 5 | 12 |
| 80 | 10 | 10 | 0 |
| 70 | 15 | 15 | −6 |
| 60 | 20 | 20 | −33 |
| 50 | 25 | 25 | −57 |
| 40 | 30 | 30 | −60 |
| 30 | 35 | 35 | −63 |
| 20 | 40 | 40 | −15 |
| 10 | 45 | 45 | −69 |

Examples 8 to 14

Examples 8 to 14 comprise Nonionic Surfactant, Anionic Surfactant, alcohol, and water. Tables 8 to 14 show pour point data for Examples 8 to 14, respectively.

TABLE 8

| Anionic Surfactant (wt %) | Nonionic Surfactant (wt %) | Propyl CELLOSOLVE (wt %) | Pour Point (° C.) |
|---|---|---|---|
| 83.8 | 16.2 | 0 | −27 |
| 73.5 | 14.2 | 12.3 | −39 |
| 65.5 | 12.7 | 21.8 | −57 |
| 59.1 | 11.4 | 29.5 | −51 |
| 53.8 | 10.4 | 35.8 | −54 |
| 49.4 | 9.5 | 41.1 | −69 |
| 45.6 | 8.8 | 45.6 | −63 |
| 42.4 | 8.2 | 49.4 | −72 |
| 39.6 | 7.6 | 52.8 | −84 |
| 37.1 | 7.2 | 55.7 | −78 |
| 34.9 | 6.8 | 58.3 | −81 |

TABLE 9

| Anionic Surfactant (wt %) | Nonionic Surfactant (wt %) | Butyl CELLOSOLVE (wt %) | Pour Point (° C.) |
|---|---|---|---|
| 83.8 | 16.2 | 0 | −33 |
| 73.5 | 14.2 | 12.3 | −30 |
| 65.5 | 12.7 | 21.8 | −39 |
| 59.1 | 11.4 | 29.5 | −42 |
| 53.8 | 10.4 | 35.8 | −45 |
| 49.4 | 9.5 | 41.1 | −42 |
| 45.6 | 8.8 | 45.6 | −42 |
| 42.4 | 8.2 | 49.4 | −51 |
| 39.6 | 7.6 | 52.8 | −78 |
| 37.1 | 7.2 | 55.7 | −78 |
| 34.9 | 6.8 | 58.3 | −81 |

TABLE 10

| Anionic Surfactant (wt %) | Nonionic Surfactant (wt %) | Propylene Glycol (wt %) | Pour Point (° C.) |
|---|---|---|---|
| 83.8 | 16.2 | 0 | −18 |
| 73.5 | 14.2 | 12.3 | −45 |
| 65.5 | 12.7 | 21.8 | −60 |
| 59.1 | 11.4 | 29.5 | −60 |
| 53.8 | 10.4 | 35.8 | −60 |
| 49.4 | 9.5 | 41.1 | −60 |
| 45.6 | 8.8 | 45.6 | −63 |
| 42.4 | 8.2 | 49.4 | −60 |
| 39.6 | 7.6 | 52.8 | −63 |
| 37.1 | 7.2 | 55.7 | −66 |
| 34.9 | 6.8 | 58.3 | −69 |

TABLE 11

| Anionic Surfactant (wt %) | Nonionic Surfactant (wt %) | Isopropanol (wt %) | Pour Point (° C.) |
|---|---|---|---|
| 83.8 | 16.2 | 0 | −27 |
| 73.5 | 14.2 | 12.3 | −39 |
| 65.5 | 12.7 | 21.8 | −36 |
| 59.1 | 11.4 | 29.5 | −45 |
| 53.8 | 10.4 | 35.8 | −57 |
| 49.4 | 9.5 | 41.1 | −57 |
| 45.6 | 8.8 | 45.6 | −60 |
| 42.4 | 8.2 | 49.4 | −63 |
| 39.6 | 7.6 | 52.8 | −66 |
| 37.1 | 7.2 | 55.7 | −69 |
| 34.9 | 6.8 | 58.3 | −69 |

TABLE 12

| Anionic Surfactant (wt %) | Nonionic Surfactant (wt %) | DOWANOL PM (wt %) | Pour Point (° C.) |
|---|---|---|---|
| 83.8 | 16.2 | 0 | −24 |
| 73.5 | 14.2 | 12.3 | −45 |
| 65.5 | 12.7 | 21.8 | −45 |
| 59.1 | 11.4 | 29.5 | −72 |
| 53.8 | 10.4 | 35.8 | −66 |
| 49.4 | 9.5 | 41.1 | −72 |
| 45.6 | 8.8 | 45.6 | −72 |
| 42.4 | 8.2 | 49.4 | −72 |
| 39.6 | 7.6 | 52.8 | −78 |
| 37.1 | 7.2 | 55.7 | −78 |
| 34.9 | 6.8 | 58.3 | −78 |

TABLE 13

| Anionic Surfactant (wt %) | Nonionic Surfactant (wt %) | Methyl CARBITOL (wt %) | Pour Point (° C.) |
|---|---|---|---|
| 83.8 | 16.2 | 0 | −24 |
| 73.5 | 14.2 | 12.3 | −42 |
| 65.5 | 12.7 | 21.8 | −45 |
| 59.1 | 11.4 | 29.5 | −57 |
| 53.8 | 10.4 | 35.8 | −60 |
| 49.4 | 9.5 | 41.1 | −63 |
| 45.6 | 8.8 | 45.6 | −63 |
| 42.4 | 8.2 | 49.4 | −66 |
| 39.6 | 7.6 | 52.8 | −66 |
| 37.1 | 7.2 | 55.7 | −15 |
| 34.9 | 6.8 | 58.3 | −75 |

TABLE 14

| Anionic Surfactant (wt %) | Nonionic Surfactant (wt %) | CARBITOL (wt %) | Pour Point (° C.) |
|---|---|---|---|
| 83.8 | 16.2 | 0 | −27 |
| 73.5 | 14.2 | 12.3 | −48 |
| 65.5 | 12.7 | 21.8 | −60 |
| 59.1 | 11.4 | 29.5 | −54 |
| 53.8 | 10.4 | 35.8 | −63 |
| 49.4 | 9.5 | 41.1 | −60 |
| 45.6 | 8.8 | 45.6 | −60 |
| 42.4 | 8.2 | 49.4 | −66 |
| 39.6 | 7.6 | 52.8 | −63 |
| 37.1 | 7.2 | 55.7 | −63 |
| 34.9 | 6.8 | 58.3 | −72 |

What is claimed is:

1. A method for recovering petroleum from a subterranean oil-containing formation, the method comprising the step of injecting an aqueous wettability modifier solution into the subterranean oil-containing formation wherein the aqueous wettability modifier solution comprises:
   (i) a nonionic surfactant of structure (Ib):

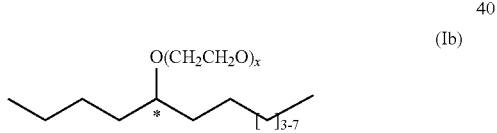

(Ib)

where the asterisk indicates the chain is on any secondary carbon, the bracket of 3-7 indicates a repeat of 3-7 carbons, corresponding to a distribution of C11-C15 total chain length, and x is selected from 5, 7, 9, 12, 15, and 20;

(ii) optionally an anionic surfactant of structure (II):

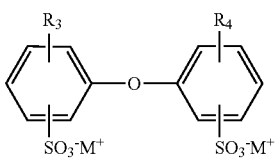

II where $R_3$ and $R_4$ are each independently selected from a group consisting of hydrogen and linear and branched alkyl groups with one to 16 carbons; and M is selected from sodium, potassium, lithium and ammonium, (iii) an alcohol selected from isopropanol, diethyleneglycol monobutyl ether, diethylene glycol monopropyl ether, diethyleneglycol monoethyl ether, diethyleneglycol monomethyl ether, ethyleneglycol monopentylether, ethyleneglycol monobutyl ether, ethyleneglycol monopropylether, ethyleneglycol monoethylether, ethyleneglycol monomethylether, dipropyleneglycol monomethyl ether, dipropyleneglycol monobutyl ether, propylene glycol monomethyl ether, propylene glycol monoethyl ether, propylene glycol monopropyl ether, propylene glycol monobutyl ether, butyl acetate, propylene glycol, ethylene glycol, and combinations thereof and (iv) water.

2. The method of claim 1 wherein the aqueous wettability solution has a pour point equal to or less than 15° C.

3. The method of claim 1 wherein:
   (i) the nonionic surfactant is present in an amount of 10 to 90 weight percent, and
   (iii) the one or more alcohol is present in an amount of 10 to 90 weight percent, wherein the balance is made up of (iv) water so that the total of (i), (iii), and (iv) equal 100 weight percent.

4. The method of claim 3 wherein:
   (ii) the anionic surfactant is present in an amount of 10 to 50 weight percent, and wherein the balance is made up of (iv) water so that the total of (i), (ii), (iii), and (iv) equal 100 weight percent.

5. The method claim 1 wherein $R_3$ and $R_4$ are each independently selected from hydrogen or a linear hexyl group provided both $R_3$ and $R_4$ are not both hydrogen.

6. The method of claim 1, wherein the optional anionic surfactant is present in the aqueous wettability modifier solution.

* * * * *